United States Patent
Crawford et al.

(10) Patent No.: US 10,885,613 B2
(45) Date of Patent: Jan. 5, 2021

(54) REAL-TIME ALTERATION OF UNDERWATER IMAGES

(71) Applicant: International Business Machines Corporation, Armonk, NY (US)

(72) Inventors: Glenn P. Crawford, Cary, NC (US); Christopher R. Florence, Raleigh, NC (US); Rocky D. McMahan, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 69 days.

(21) Appl. No.: 16/244,309

(22) Filed: Jan. 10, 2019

(65) Prior Publication Data
US 2020/0226726 A1    Jul. 16, 2020

(51) Int. Cl.
*G06T 5/00* (2006.01)
*G06T 7/50* (2017.01)
(Continued)

(52) U.S. Cl.
CPC .............. *G06T 5/008* (2013.01); *G01J 3/463* (2013.01); *G01J 3/465* (2013.01); *G06T 7/50* (2017.01);
(Continued)

(58) Field of Classification Search
CPC ... G06T 5/008; G06T 7/50; G06T 7/90; G01J 3/465; G01J 2003/466; G01J 2003/467
See application file for complete search history.

(56) References Cited

U.S. PATENT DOCUMENTS 5,113,214 A * 5/1992 Nagata .................. G02B 7/102
348/347
9,443,488 B2 9/2016 Borenstein et al.
(Continued)

FOREIGN PATENT DOCUMENTS

CN          105068248 A        11/2015
JP          2009200589 A   *    9/2009

OTHER PUBLICATIONS

Xueyang Fu, A retinex-based enhancing approach for single underwater image, 2014 IEEE International Conference on Image Processing (ICIP), Paris, 2014, pp. 4572-4576. (Year: 2014).*
(Continued)

*Primary Examiner* — Brenda C Bernardi
(74) *Attorney, Agent, or Firm* — Cantor Colburn LLP; Teddi Maranzano

(57) ABSTRACT

Provided are systems, methods, and media for real-time alteration of underwater images. An example method includes receiving an image that is captured by a wearable electronic device of a user while submerged in water, in which the wearable electronic device of the user includes one or more display screens and one or more sensors, and in which the one or more sensors include one or more cameras that are configured to capture the image. The method includes adjusting the image based, at least in part, on one or more environmental factors of the water, in which the adjusting of the image includes adjusting colors of the image to compensate for changes in color while submerged in the water. The method includes causing the wearable electronic device to display the adjusted image to the user while submerged in water via the one or more display screens.

17 Claims, 6 Drawing Sheets

(51) Int. Cl.
*G06T 7/90* (2017.01)
*G01J 3/46* (2006.01)

(52) U.S. Cl.
CPC .......... *G06T 7/90* (2017.01); *G01J 2003/466* (2013.01); *G01J 2003/467* (2013.01)

(56) References Cited

U.S. PATENT DOCUMENTS

| | | | | |
|---|---|---|---|---|
| 9,836,828 | B2 | 12/2017 | Jones et al. | |
| 9,983,667 | B2 | 5/2018 | Tang et al. | |
| 10,025,098 | B2 | 7/2018 | Lee et al. | |
| 2006/0221226 | A1* | 10/2006 | Yanof | H04N 5/367 348/346 |
| 2007/0237505 | A1* | 10/2007 | Takita | G03B 17/08 396/25 |
| 2007/0280538 | A1* | 12/2007 | Okamoto | G06K 9/00664 382/190 |
| 2011/0228074 | A1* | 9/2011 | Parulski | H04N 21/42202 348/81 |
| 2011/0228075 | A1* | 9/2011 | Madden | G03B 15/05 348/81 |
| 2012/0188362 | A1* | 7/2012 | Takimoto | G03B 17/08 348/81 |
| 2015/0348245 | A1* | 12/2015 | Horiuchi | H04N 9/67 382/167 |
| 2016/0094824 | A1* | 3/2016 | Yang | G06T 5/003 348/243 |
| 2016/0270656 | A1 | 9/2016 | Samec et al. | |
| 2017/0322422 | A1 | 11/2017 | Stone et al. | |
| 2018/0218642 | A1 | 8/2018 | Shamim et al. | |
| 2019/0098179 | A1* | 3/2019 | Hung | G03B 17/08 |

OTHER PUBLICATIONS

Huimin Lu, Underwater image enhancement using guided trigonometric bilateral filter and fast automatic color correction, 2013 IEEE International Conference on Image Processing, Melbourne, VIC, 2013, pp. 3412-3416. (Year: 2013).*
Anonymous; "Google Glass"; Wikipedia <https://en.wikipedia.org/wiki/Google_Glass>; Saved from the World Wide Web on Jan. 9, 2019; 16 pages.
Anonymous; "Sight-restoring glasses for the visually impaired"; <https://www.esighteyewear.com/#How-eSight-Works>; Aug. 30, 2018; 22 pages.
Anonymous; "Underwater vision"; Wikipedia <https://en.wikipedia.org/wiki/Underwater_vision> Saved from the World Wide Web on Jan. 9, 2019; 8 pages.
Massof et al.; "Low Vision Enhancement System"; Johns Hopkins APL Technical Digest. vol. 15. No. 2 (1994); 6 pages.
Mayer et al., "Electronic Vision Enhancement System"; Proceedings of the 5th International Conference on Interdisciplinary Aspects in Computers Helping People with Special Needs, ICCHP'96, 1996; 9 pages.
Mell et al.; "The NIST Definition of Cloud Computing—Recommendations of the National Institute of Standards and Technology"; U.S. Department of Commerce; Sep. 2011; 7 pages.
Neporent; "Self Adjusting Glasses Offer Instant Vision Fix"; ABC News; Nov. 11, 2013; <http://abcnews.go.com/Health/adjusting-glasses-offer-users-instantvisionfix/story?id=20852595>; 3 pages.

* cited by examiner

REAL-TIME ALTERATION OF UNDERWATER IMAGES

BACKGROUND

The present invention generally relates to image and video processing, and more specifically, to real-time alteration of underwater images.

Present technology for improving eyesight and visual representations is limited. Users typically purchase a specific pair of glasses based on their eyesight prescription to improve vision. Vision problems are usually specific to each person and change from person to person thus requiring glasses to be specifically made for a particular individual. Some users wear multiple glasses for different specific needs while some users wear a single pair of glasses that are suitable for more than one environment (e.g., bifocals, trifocals, graduated lens, etc.).

Some users have implemented technological wearable devices, such as goggles with cameras to determine the prescription of a wearer and adjust the images based on the prescription of the wearer. However, said devices are drastically limited for additional applications that are based on particular characteristics of the environment, such as for use underwater.

SUMMARY

Embodiments of the present invention provide a computer-implemented method for real-time alteration of underwater images. A non-limiting example of the computer-implemented method includes receiving, by a system comprising one or more processors, an image that is captured by a wearable electronic device of a user while submerged in water, in which the wearable electronic device of the user includes one or more display screens and one or more sensors, and in which the one or more sensors include one or more cameras that are configured to capture the image. The method includes adjusting, by the system, the image based, at least in part, on one or more environmental factors of the water, in which the adjusting of the image includes adjusting colors of the image to compensate for changes in color while submerged in the water. The method includes causing, by the system, the wearable electronic device to display the adjusted image to the user while submerged in water, in which the adjusted image is displayed via the one or more display screens of the wearable electronic device.

Embodiments of the present invention provide a system for real-time alteration of underwater images. A non-limiting example of the system includes one or more processors configured to perform a method. A non-limiting example of the computer-implemented method includes receiving, by the system, an image that is captured by a wearable electronic device of a user while submerged in water, in which the wearable electronic device of the user includes one or more display screens and one or more sensors, and in which the one or more sensors include one or more cameras that are configured to capture the image. The method includes adjusting, by the system, the image based, at least in part, on one or more environmental factors of the water, in which the adjusting of the image includes adjusting colors of the image to compensate for changes in color while submerged in the water. The method includes causing, by the system, the wearable electronic device to display the adjusted image to the user while submerged in water, in which the adjusted image is displayed via the one or more display screens of the wearable electronic device.

Embodiments of the invention provide a computer program product real-time alteration of underwater images, the computer program product comprising a computer readable storage medium having program instructions embodied therewith. The program instructions are executable by a system comprising one or more processors to cause the system to perform a method. A non-limiting example of the computer-implemented method includes receiving, by the system, an image that is captured by a wearable electronic device of a user while submerged in water, in which the wearable electronic device of the user includes one or more display screens and one or more sensors, and in which the one or more sensors include one or more cameras that are configured to capture the image. The method includes adjusting, by the system, the image based, at least in part, on one or more environmental factors of the water, in which the adjusting of the image includes adjusting colors of the image to compensate for changes in color while submerged in the water. The method includes causing the wearable electronic device to display the adjusted image to the user while submerged in water, in which the adjusted image is displayed via the one or more display screens of the wearable electronic device.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
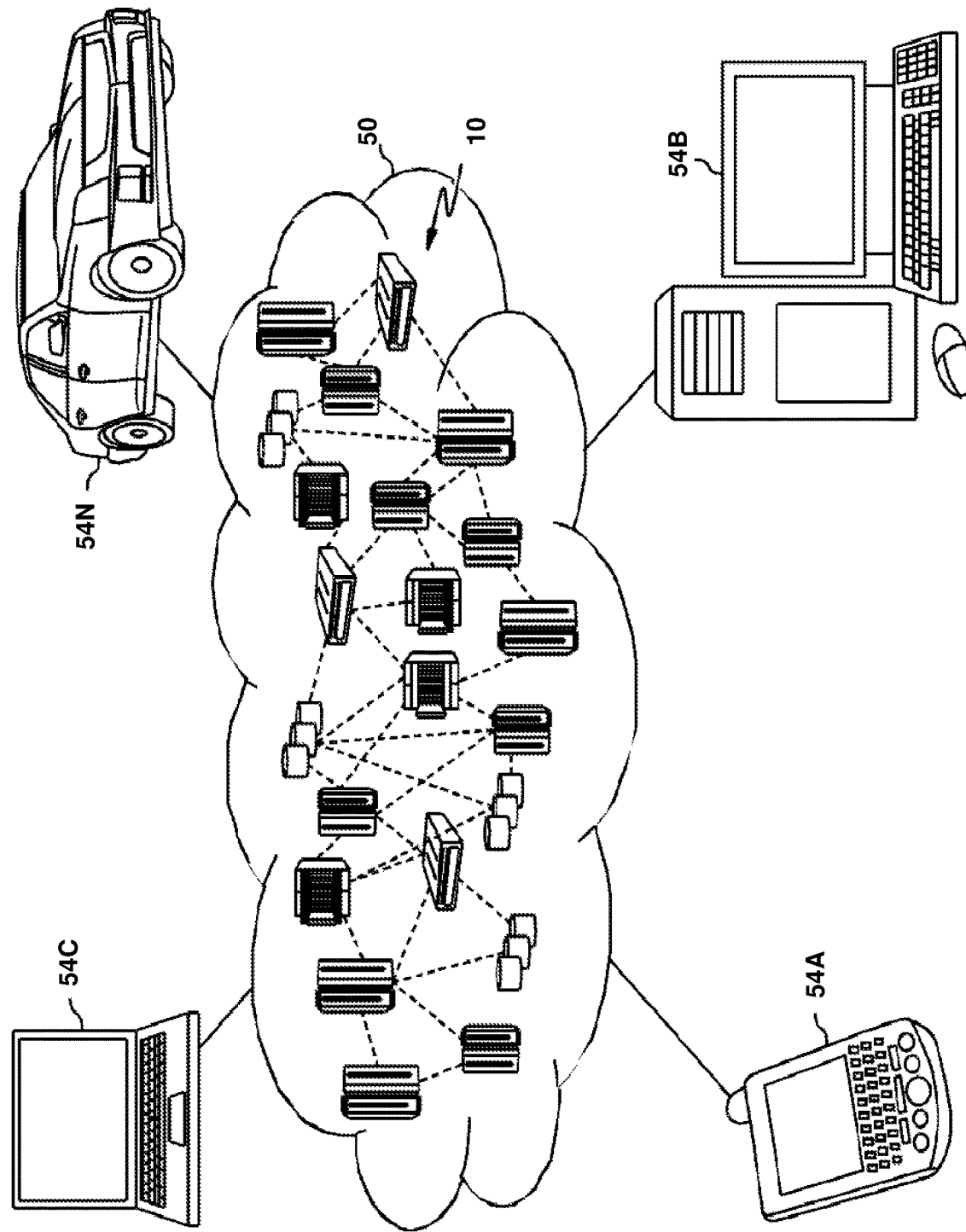
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two-digit or three-digit reference numbers. With minor exceptions (e.g., FIGS. 1-2), the leftmost digit of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
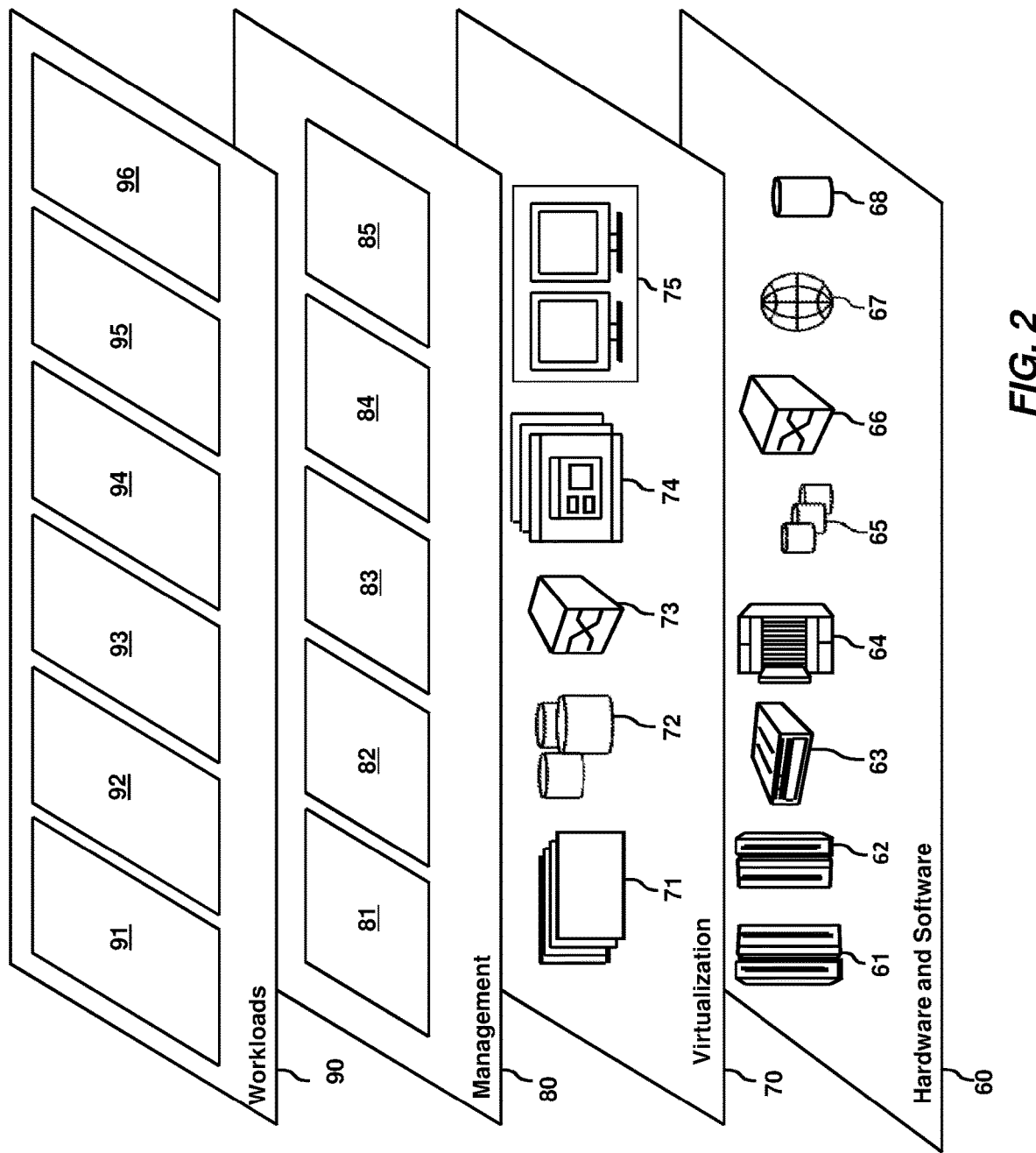
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video alteration processing 96.

Turning now to an overview of technologies that are more specifically relevant to aspects of the invention, as noted above, present technology for improving eyesight and visual representations is limited. Users typically purchase a specific pair of glasses based on their eyesight prescription to improve vision. Vision problems are usually specific to each person and change from person to person thus requiring glasses to be specifically made for a particular individual. Some users wear multiple glasses for different specific needs while some users wear a single pair of glasses that are suitable for more than one environment (e.g., bifocals, trifocals, graduated lens, etc.).

Some users have implemented technological wearable devices, such as goggles, with cameras to determine the prescription of a wearer and adjust the images based on the prescription of the wearer. However, said devices are drastically limited for additional applications that are based on particular characteristics of the environment, such as for use under water.

Turning now to an overview of the aspects of the invention, one or more embodiments of the invention address the above-described shortcomings of the prior art by providing a computing system that is configured to utilize built-in cameras and imaging technology in combination with analytics to create viewable images on a wearable device. The images that are created are displayed on a surface of a wearable device in front of the eyes of the user (e.g., via glasses, goggles, scuba mask, etc.). The images that are received viewing input from the cameras are used to create a new set of images that are displayed based on user-specific factors (e.g., user settings) and/or environmental factors such as characteristics of a body of water (e.g., saline concentration, depth, pressure, visible spectrum, murkiness, amount of particulates, etc.).

For example, in some embodiments of the present invention, the computer system receives an image that is captured by a wearable electronic device of a user while submerged in water. In some embodiments of the present invention, the wearable electronic device of the user includes one or more display screens and one or more sensors, in which the one or more sensors include one or more cameras that are configured to capture the image. The computer system adjusts the image based, at least in part, on one or more environmental factors of the water and then causes the wearable electronic device to display the adjusted image to the user while submerged in water. The adjusted image is displayed via the one or more display screens of the wearable electronic device. In some embodiments of the present invention, the adjusting of the image includes adjusting colors of the image to compensate for changes in color due to loss of light at deeper depths underwater. The device then determines which colors are diminished and/or not visible at a current depth underwater and compensates for the missing color by adding the color back into the image.

Figure 3:
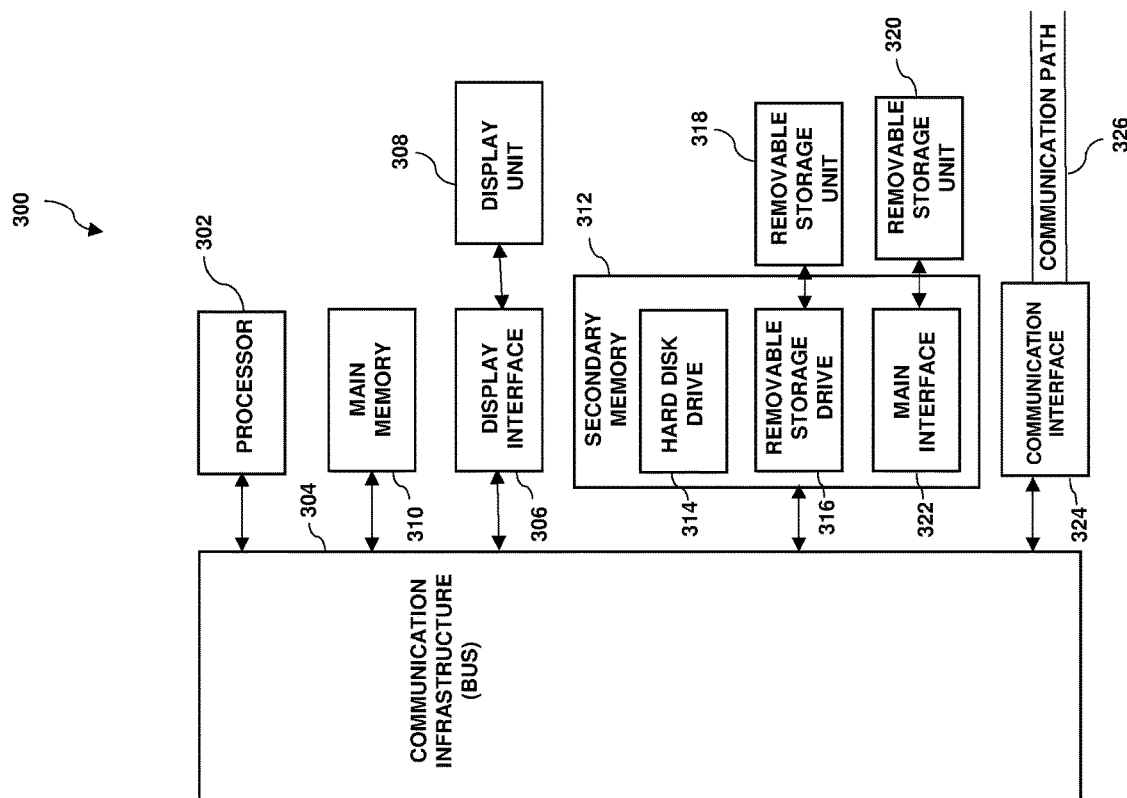
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 that is useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc., which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
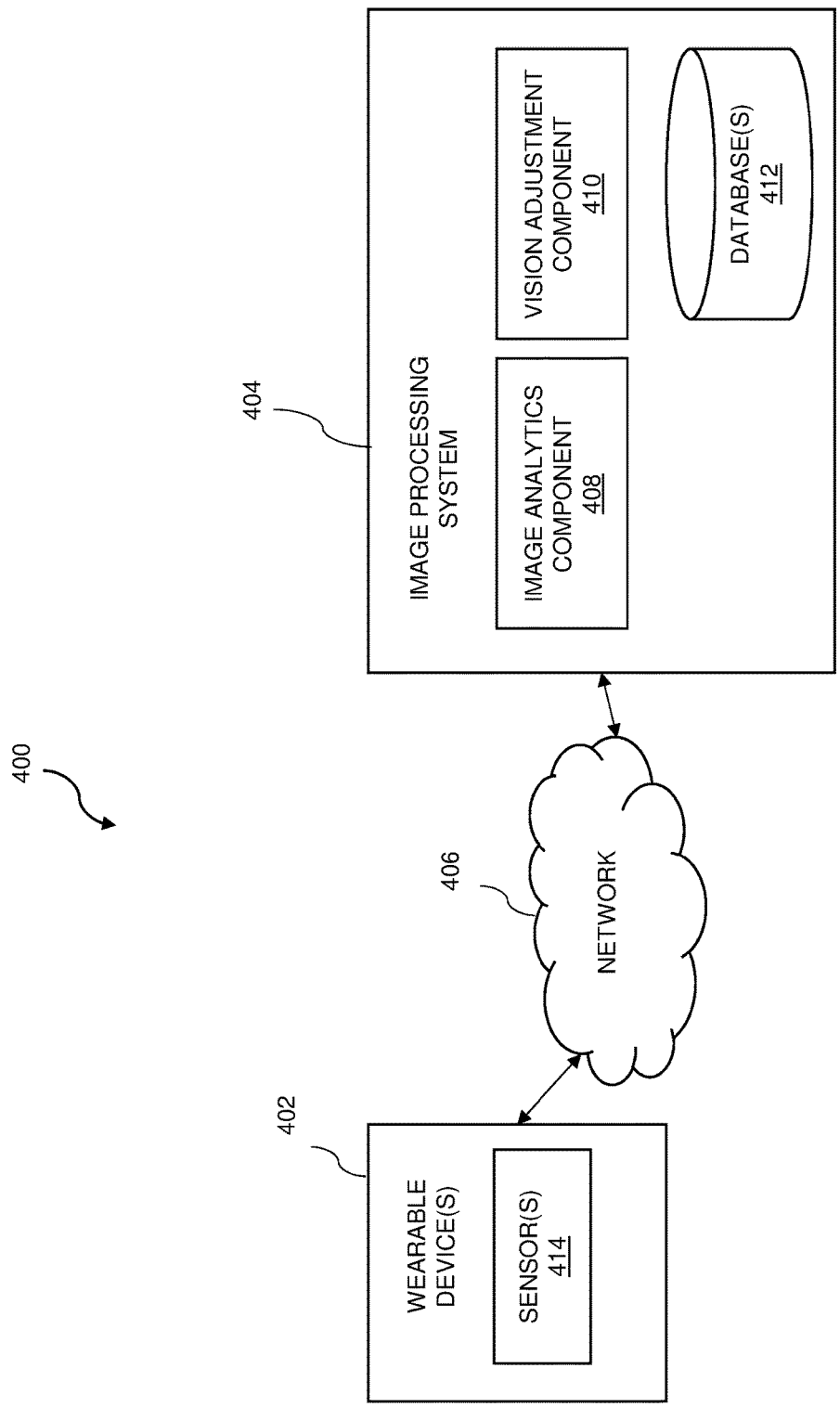
FIG. 4 depicts an example of a distributed environment in accordance with one or more embodiments of the present invention.

Referring now to FIG. 4, an example of a distributed environment 400 is presented for real-time image alteration. Distributed environment 400 includes one or more wearable devices 402 and an image processing system 404, which are interconnected via network 406. FIG. 4 provides an illustration of only one example system and does not imply any limitation with regard to other systems in which different embodiments of the present invention may be implemented. For example, in some embodiments of the present invention, wearable devices 402 and/or image processing system 404 are a single device. Various suitable modifications to the depicted environment may be made, by those skilled in the art, without departing from the scope of the invention as recited by the claims.

Image processing system 404 includes an image analytics component 408, a vision adjustment component 410, and one or more databases 412. In some embodiments of the present invention, database 412 includes one or more video related databases such as, for example, an image repository, a video repository, and/or a video scene target gaze zone viewing behavior repository. In some embodiments of the present invention, image analytics component 408, vision adjustment component 410, and/or database 412 are interconnected via a communication infrastructure 304 and/or communication path 326. Image processing system 404 may have internal and external hardware components, such as those depicted and described above with respect to FIG. 3.

In some embodiments of the present invention, image processing system 404 is a standalone computing device, a management server, a web server, a mobile computing device, or other suitable electronic device and/or computing system capable of receiving, sending, and processing data. In some embodiments of the present invention, image processing system 404 is a server computing system utilizing multiple computers, such as in cloud computing environment 50. In some embodiments of the present invention, image processing system 404 is a laptop computer, a tablet computer, a netbook computer, a personal computer (PC), a desktop computer, a personal digital assistant (PDA), a smartphone, or other suitable programmable electronic device capable of communicating with wearable device 402 and other computing devices (not shown) within distributed environment 400 via network 406. In some embodiments of the present invention, image processing system 404 is a computing system utilizing clustered computers and components (e.g., database server computers, application server computers, etc.) that act as a single pool of seamless resources that are accessible within distributed environment 400. Image processing system 404 may have internal and external hardware components, such as those depicted and described above with respect to FIG. 3.

Network 406 can be, for example, a telecommunications network, a local area network (LAN), a wide area network (WAN), such as the Internet, or a combination of the three, and can include wired, wireless, or fiber optic connections. Network 406 can include one or more wired and/or wireless networks that are capable of receiving and transmitting data, voice, and/or video signals, including multimedia signals that include voice, data, and video information. In general, network 406 can be any suitable combination of connections and protocols that can support communications between wearable device 402, image processing system 404, and/or other computing devices (not shown) within a distributed environment 400. In some embodiments of the present invention, distributed environment 400 is implemented as part of a cloud computing environment such as cloud computing environment 50 (FIG. 1).

Wearable device 402 includes one or more sensors 414 and is configured to allow users to send and/or receive information to image processing system 404, which in turn allows users to access image analytics component 408, vision adjustment component 410, and/or database 412. For example, wearable device 402 is configured to capture images of an environment such as water via the sensors 414 (e.g., cameras), capture one or more environmental characteristics via the one or more sensors 414 (e.g., spectrometer, spectrophotometer, etc.) and to present adjusted images based, at least in part, on the environmental characteristics. In some embodiments of the present invention, the environmental characteristics that are captured via the sensors 414 include, a present underwater depth, a water concentration, a captured visibility spectrum, and/or other suitable environmental characteristics that influence the ability to correctly see a distorted image. In some embodiments of the present invention, the adjusted images are generated and/or transmitted by image processing system 404 (e.g., via image analytics component 408 and vision adjustment component 410). In some embodiments of the present invention, wearable device 402 is configured to gather user input data, biometric data, and audible data, in addition to visual data. For example, in some embodiments of the present invention, wearable device 402 and sensors 414 include one or more sensors for obtaining sensor data of the user, such as detecting head movement of the user, detecting a facial expression of the user, detecting a prescription of the user, and/or tracking an eye gaze of the user. In some embodiments of the present invention, wearable device 402 is configured to capture audio via a microphone of wearable device 402.

In some embodiments of the present invention, wearable device 402 is a laptop computer, a tablet computer, a netbook computer, a personal computer (PC), a desktop computer, a personal digital assistant (PDA), a smartphone, an internet-of-things (IoT) enabled device, a VR/Augmented Reality (AR) display device, and/or other suitable programmable electronic devices capable of communicating with various components and devices within distributed environment 400. In some embodiments of the present invention, wearable device 402 comprises two or more separate devices. In some embodiments of the present invention, wearable device 402 is a programmable electronic mobile device or a combination of programmable electronic mobile devices capable of executing machine readable program instructions and communicating with other computing devices (not shown) within distributed environment 400. In some embodiments of the present invention, wearable device 402 may include internal and external hardware components, such as those depicted and described above with respect to FIG. 3.

Figure 5:
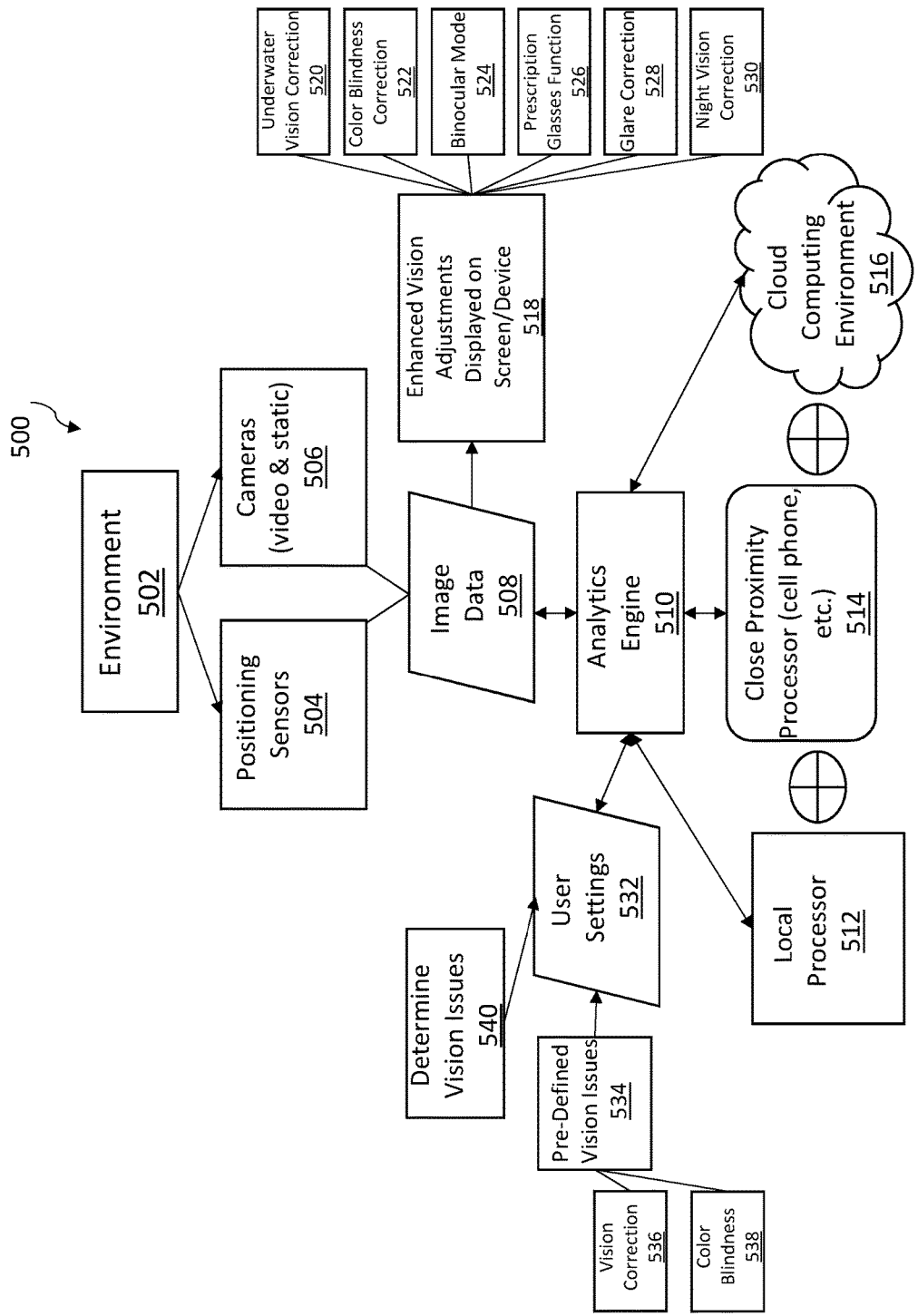
FIG. 5 depicts an example of a framework in accordance with one or more embodiments of the present invention.

FIG. 5 illustrates an example of a framework 500 for implementing one or features of wearable device 402 and/or image processing system 404 in accordance with one or more embodiments of the present invention. In example framework 500, positioning data and images are captured from an environment 502 (e.g., underwater) via one or more positioning sensors 504 and one or more cameras 506 of wearable device (e.g., wearable device 402 of FIG. 4). In some embodiments of the present invention, the image data 508 is as video data. The image data 508 and/or positioning sensor data is received by an analytics engine 510 (e.g., image analytics component 408 of FIG. 4), which may be housed within the wearable device and/or within an image processing system (e.g., image processing system 404 of FIG. 4). For example, in some embodiments of the present invention, analytics engine 510 is executed, housed, and/or in communication with a local processor 512 of the wearable device, a close proximity processor 514 (e.g., a processor of a device that is near the wearable device such as a cell phone or the user), and/or a cloud computing environment 516 (e.g., cloud computing environment 50 of FIG. 1).

Analytics engine 510 is configured to adjust images that were input into the cameras to create a new set of images that improve the visibility of objects within the image. For example, in some embodiments of the present invention, analytics engine is configured to cause the wearable electronic device to display enhanced vision adjusted images 518 (e.g., via vision adjustment component 410 of FIG. 4). In some embodiments of the present invention, the enhanced vision adjusted images 518 includes underwater vision correction 520, color blindness correction 522, binocular mode 524, prescription glasses function 526, glare correction 528, night vision correction 530, and/or other suitable visual correction functionality.

In some embodiments of the present invention, underwater vision correction 520 includes adjusting captured images while a user is submerged in water to compensate for changes in color and loss of light while the user of the wearable device is submerged underwater, in which the adjusted image is displayed via the one or more display screens of the wearable electronic device. The adjusted image is generated based, at least in part, on one or more environmental factors of the water. For example, in some embodiments of the present invention, a spectrophotometer is used to obtain readings of a visible spectrum of light as the wearable device is submerged underwater. In some embodiments of the present invention, the colors are adjusted by identifying, based on the readings of the visible spectrum, one or more colors that have lower intensity as compared to a predetermined intensity, and then adjusting the captured image to increase the intensity of the one or more identified colors for display to the user. In some embodiments of the present invention, the lower intensity is due to having less light underwater. The use of a spectrophotometer allows for identifying the visible spectrum without the need to measure the depth of submersion.

In some embodiments of the present invention, in addition to or in alternative to using a spectrophotometer, the one or more position sensors are utilized to obtain readings as to a depth of the wearable device as the device is submerged in water. In some embodiments of the present invention, the images are adjusted based on identifying, from a table stored in database 412, a visible spectrum of light that is associated with the depth that is established by the readings, identifying one or more colors from the table that are associated with an intensity that is lower than a predetermined intensity, and then adjusting the captured image to increase the intensity of the one or more identified colors for display to the user. For example, if the color blue is detected as being missing and/or below a predetermined intensity level, the image may be adjusted by adding the color blue back into the image to restore the missing color.

In some embodiments of the present invention, the table includes intensity values that are associated with a depth corresponding to concentration values (e.g., saltwater concentration values). In some embodiments of the present invention, the table further or alternatively includes frequencies and degrees of diffraction that are associated with the concentration values at the depth obtained by the reading. In some embodiments of the present invention, the predetermined intensity is the intensity corresponding to the color in air at ambient temperature. In some embodiments of the present invention, the intensity is represented as a percentage of color.

In some embodiments of the present invention, color blindness correction 522 includes adjusting captured images to compensate for color blindness of the user of the wearable device, in which the colorblindness of the user is either predetermined or detected in real-time. In some embodiments of the present invention, binocular mode 524 includes adjusting captured images to compensate for distance similar to binoculars. In some embodiments of the present invention, prescription glasses function 526 includes adjusting captured images to compensate for a prescription of the user, in which the prescription of the user is either predetermined or detected in real-time. In some embodiments of the present invention, glare correction 528 includes adjusting captured images to compensate for brightness and/or glare. In some embodiments of the present invention, night vision correction 530 includes adjusting captured images to compensate for darkness to allow for better vision at night.

In some embodiments of the present invention analytics engine 510 takes into consideration user settings 532 of a particular user such as for example, settings that establish predefined vision issues 534 of the user such as a known need for vision correction 536, and/or color blindness 538 of the user. In some embodiments of the present invention, the user settings 532 are based on a real-time determination of vision issues 540 via through the user of the wearable device, in which the wearable device is configured to detect vision issues of the user as the user is wearing the wearable device. For example, in some embodiments the present invention, the user defines user settings 532 by inputting the settings into the wearable device and/or other computer system, in which the settings include for example, a prescription, colorblindness information, and/or other vision settings. In some embodiments of the present invention, the wearable device causes a user test to be performed by presenting that user with a series of eye tests and images to determine the user's current vision (e.g. determine vision issues 540). The computing system may then utilize the results of the user test when generating the image adjustments. In some embodiments of the present images, the images are offset and adjusted to compensate for the offset angle of the cameras 506 in relation to the eyes of the user.

Figure 6:
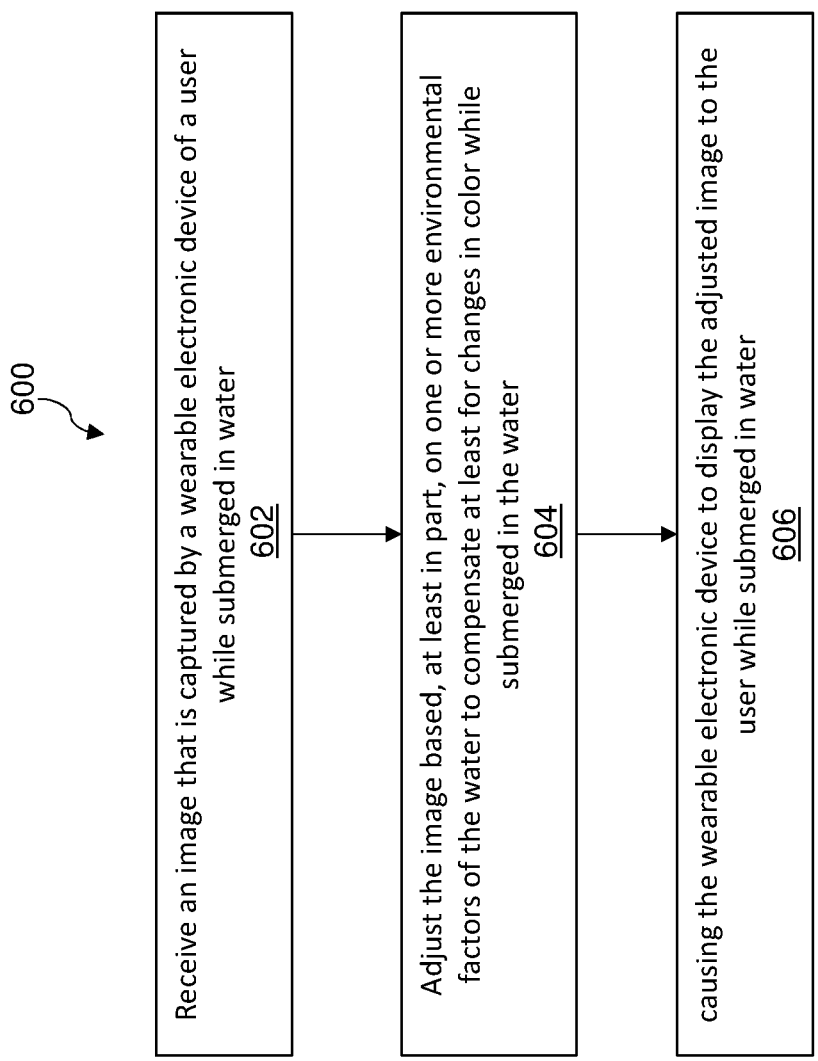
FIG. 6 depicts a flow diagram illustrating a methodology in accordance with one or more embodiments of the present invention.

Additional details of the operation of processing system 404 will now be described with reference to FIG. 6, wherein FIG. 6 depicts a flow diagram illustrating a methodology 600 according to one or more embodiments of the present invention. At block 602, an image is received that is captured by a wearable electronic device of a user while the user is submerged in water. At block 604, the image is adjusted based, at least in part, on one or more environmental factors of the water (e.g., via image analytics component 408). The adjusting of the image includes adjusting colors of the image to compensate for changes in color while submerged in the water. At block 606, the wearable electronic device is caused to display the adjusted image to the user while the user is submerged in water (e.g., via vision adjustment component 410), in which the adjusted image is displayed via the one or more display screens of the wearable electronic device.

In some embodiments of the present invention, the one or more sensors include one or more position sensors, in which the sensors measure the depth of submersion. In some embodiments of the present invention, the adjusting of the colors includes identifying a depth of the wearable electronic device while submerged in water based on the one or more position sensors, in which the one or more environmental factors include the depth. The adjusting of the colors further includes identifying, from a table stored in a database, a visible spectrum of light that is associated with the depth at a particular concentration level (e.g., salt water of a particular concentration), identifying one or more colors from the table that have lower intensity as compared to a predetermined intensity, and adjusting the captured image to increase the intensity of the one or more identified colors for display to the user. For example, as the depth increases, the color red may be the first to reduce and/or disappear, whereas the color yellow may be the last to reduce and/or disappear.

In some embodiments of the present invention, the one or more sensors include a spectrophotometer. In some embodiments of the present invention, the adjusting of the colors includes identifying, based on readings of a visible spectrum of light captured by the spectrophotometer, one or more colors that have lower intensity as compared to a predetermined intensity, and then adjusting the captured image to increase the intensity of the one or more identified colors for display to the user.

In some embodiments of the present invention, in alternative and/or in addition to the underwater color adjustment of the image, the image is adjusted based on an eyesight prescription of the user by offsetting pixels of the image to compensate for an offset angle of the one or more cameras and the one or more sensors in relationship to eyes of the user.

In some embodiments of the present invention, in alternative and/or in addition to the underwater color adjustment of the image, the image is adjusted based on colorblindness of the user. In some embodiments of the present invention, in alternative and/or in addition to the underwater color adjustment of the image, the image is adjusted to compensate for at least one of darkness, brightness, or glare.

In some embodiments of the present invention, in alternative and/or in addition to the underwater color adjustment of the image, the image is adjusted based on a distance to the object, in which the adjusting of the image based on the distance includes enlarging the image to compensate for the distance to the object, in which the one or more environmental factors includes the distance to the object.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for real-time alteration of underwater images, the method comprising:
   receiving, by a system comprising one or more processors, an image that is captured by a wearable electronic device of a user while submerged in water, wherein the wearable electronic device of the user includes one or more display screens and one or more sensors, wherein the one or more sensors include one or more cameras that are configured to capture the image;
   adjusting, by the system, the image based, at least in part, on one or more environmental factors of the water, wherein the adjusting of the image includes adjusting colors of the image to compensate for changes in color while submerged in the water; and
   causing the wearable electronic device to display the adjusted image to the user while submerged in the water, wherein the adjusted image is displayed via the one or more display screens of the wearable electronic device,
   wherein the image is further adjusted based on an eyesight prescription of the user by offsetting pixels of the image to compensate for an offset angle of the one or more cameras and the one or more sensors in relationship to eyes of the user.

2. The computer-implemented method of claim 1, wherein the one or more sensors include one or more position sensors, wherein the adjusting of the colors includes:
   identifying a depth of the wearable electronic device while submerged in the water based on the one or more position sensors, wherein the one or more environmental factors includes the depth;
   identifying, from a table stored in a database, a visible spectrum of light that is associated with the depth;
   identifying one or more colors from the table that have lower intensity as compared to a predetermined intensity; and
   adjusting the captured image to increase the intensity of the one or more identified colors for display to the user.

3. The computer-implemented method of claim 1, wherein the one or more sensors include a spectrophotometer, wherein the adjusting of the colors includes:
   identifying, based on readings of a visible spectrum of light captured by the spectrophotometer, one or more colors that have lower intensity as compared to a predetermined intensity; and
   adjusting the captured image to increase the intensity of the one or more identified colors for display to the user.

4. The computer-implemented method of claim 1, wherein the image is further adjusted based on colorblindness of the user.

5. The computer-implemented method of claim 1, wherein the one or more environmental factors includes a distance to an object, wherein the image is further adjusted based on the distance to the object, wherein the adjusting of the image based on the distance includes enlarging the image to compensate for the distance to the object.

6. The computer-implemented method of claim 1, wherein the image is further adjusted to compensate for at least one of darkness, brightness, or glare.

7. A computer program product for real-time alteration of underwater images, the computer program product comprising a computer readable storage medium having program instructions embodied therewith, the program instructions executable by a system comprising one or more processors to cause the system to perform a method, the method comprising:
   receiving, by the system, an image that is captured by a wearable electronic device of a user while submerged in water, wherein the wearable electronic device of the user includes one or more display screens and one or more sensors, wherein the one or more sensors include one or more cameras that are configured to capture the image;
   adjusting, by the system, the image based, at least in part, on one or more environmental factors of the water, wherein the adjusting of the image includes adjusting colors of the image to compensate for changes in color while submerged in the water; and
   causing the wearable electronic device to display the adjusted image to the user while submerged in the water, wherein the adjusted image is displayed via the one or more display screens of the wearable electronic device,
   wherein the image is further adjusted based on an eyesight prescription of the user by offsetting pixels of the image to compensate for an offset angle of the one or more cameras and the one or more sensors in relationship to eyes of the user.

8. The computer program product of claim 7, wherein the one or more sensors include one or more position sensors, wherein the adjusting of the colors includes:
   identifying a depth of the wearable electronic device while submerged in the water based on the one or more position sensors, wherein the one or more environmental factors includes the depth;
   identifying, from a table stored in a database, a visible spectrum of light that is associated with the depth;
   identifying one or more colors from the table that have lower intensity as compared to a predetermined intensity; and
   adjusting the captured image to increase the intensity of the one or more identified colors for display to the user.

9. The computer program product of claim 7, wherein the one or more sensors include a spectrophotometer, wherein the adjusting of the colors includes:
   identifying, based on readings of a visible spectrum of light captured by the spectrophotometer, one or more colors that have lower intensity as compared to a predetermined intensity; and
   adjusting the captured image to increase the intensity of the one or more identified colors for display to the user.

10. The computer program product of claim 7, wherein the image is further adjusted based on colorblindness of the user.

11. The computer program product of claim 7, wherein the one or more environmental factors includes a distance to an object, wherein the image is further adjusted based on the distance to the object, wherein the adjusting of the image based on the distance includes enlarging the image to compensate for the distance to the object.

12. The computer program product of claim 7, wherein the image is further adjusted to compensate for at least one of darkness, brightness, or glare.

13. A system for real-time alteration of video, the system comprising one or more processors configured to perform a method, the method comprising:
- receiving, by the system, an image that is captured by a wearable electronic device of a user while submerged in water, wherein the wearable electronic device of the user includes one or more display screens and one or more sensors, wherein the one or more sensors include one or more cameras that are configured to capture the image;
- adjusting, by the system, the image based, at least in part, on one or more environmental factors of the water, wherein the adjusting of the image includes adjusting colors of the image to compensate for changes in color while submerged in the water; and
- causing the wearable electronic device to display the adjusted image to the user while submerged in the water, wherein the adjusted image is displayed via the one or more display screens of the wearable electronic device,
- wherein the image is further adjusted based on an eyesight prescription of the user by offsetting pixels of the image to compensate for an offset angle of the one or more cameras and the one or more sensors in relationship to eyes of the user.

14. The system of claim 13, wherein the one or more sensors include one or more position sensors, wherein the adjusting of the colors includes:
- identifying a depth of the wearable electronic device while submerged in the water based on the one or more position sensors, wherein the one or more environmental factors includes the depth;
- identifying, from a table stored in a database, a visible spectrum of light that is associated with the depth;
- identifying one or more colors from the table that have lower intensity as compared to a predetermined intensity; and
- adjusting the captured image to increase the intensity of the one or more identified colors for display to the user.

15. The system of claim 13, wherein the one or more sensors include a spectrophotometer, wherein the adjusting of the colors includes:
- identifying, based on readings of a visible spectrum of light captured by the spectrophotometer, one or more colors that have lower intensity as compared to a predetermined intensity; and
- adjusting the captured image to increase the intensity of the one or more identified colors for display to the user.

16. The system of claim 13, wherein the image is further adjusted based on colorblindness of the user.

17. The system of claim 13, wherein the one or more environmental factors includes a distance to an object, wherein the image is further adjusted based on the distance to the object, wherein the adjusting of the image based on the distance includes enlarging the image to compensate for the distance to the object.

* * * * *